United States Patent [19]
Krammer

[11] 3,856,134
[45] Dec. 24, 1974

[54] CONVEYOR CHAIN

[75] Inventor: Robert Krammer, Farmington, Mich.

[73] Assignees: Jorgen S. Bildsoe, St. Paul, Minn.; Robert Krammer, Farmington; Myron B. Brookfield, Birmingham, both of, Mich. ; part interest to each

[22] Filed: Dec. 13, 1971

[21] Appl. No.: 207,471

[52] U.S. Cl.............. 198/189, 74/249, 104/172 C, 198/181
[51] Int. Cl............................................ B65g 17/06
[58] Field of Search................. 198/189, 181, 200; 104/172 R, 172 BT, 172 C; 74/250 R, 250 C, 252; 59/8, 35, 84, 90; 114/249

[56] References Cited
UNITED STATES PATENTS

| | | |
|---|---|---|
| 1,765,945 | 6/1930 | Shaw.................................. 198/200 |
| 2,118,348 | 5/1938 | Hoeffleur............................ 198/189 |
| 2,685,361 | 8/1954 | Garman et al. ............. 104/172 C X |
| 2,695,095 | 11/1954 | Anderson............................ 198/189 |
| 3,160,024 | 12/1964 | Mojonnier ...................... 198/189 X |
| 3,331,489 | 7/1967 | Mattson.............................. 198/189 |
| 3,390,641 | 7/1968 | Jacoby............................ 104/172 C |
| 3,421,313 | 1/1969 | Harada et al. ..................... 74/250 X |
| 3,425,536 | 2/1969 | Shader................................ 198/189 |
| 3,662,690 | 5/1972 | Galloway et al. ................ 104/172 C |

Primary Examiner—Evon C. Blunk
Assistant Examiner—James W. Miller
Attorney, Agent, or Firm—Harness, Dickey & Pierce

[57] ABSTRACT

There are disclosed two primary embodiments of a conveyor chain in each of which every link is identical to every other link, except for accessories which may be added, every link consisting of an integral structure having no separate pieces. There are also disclosed several variances of the chain for uses in different applications.

9 Claims, 11 Drawing Figures

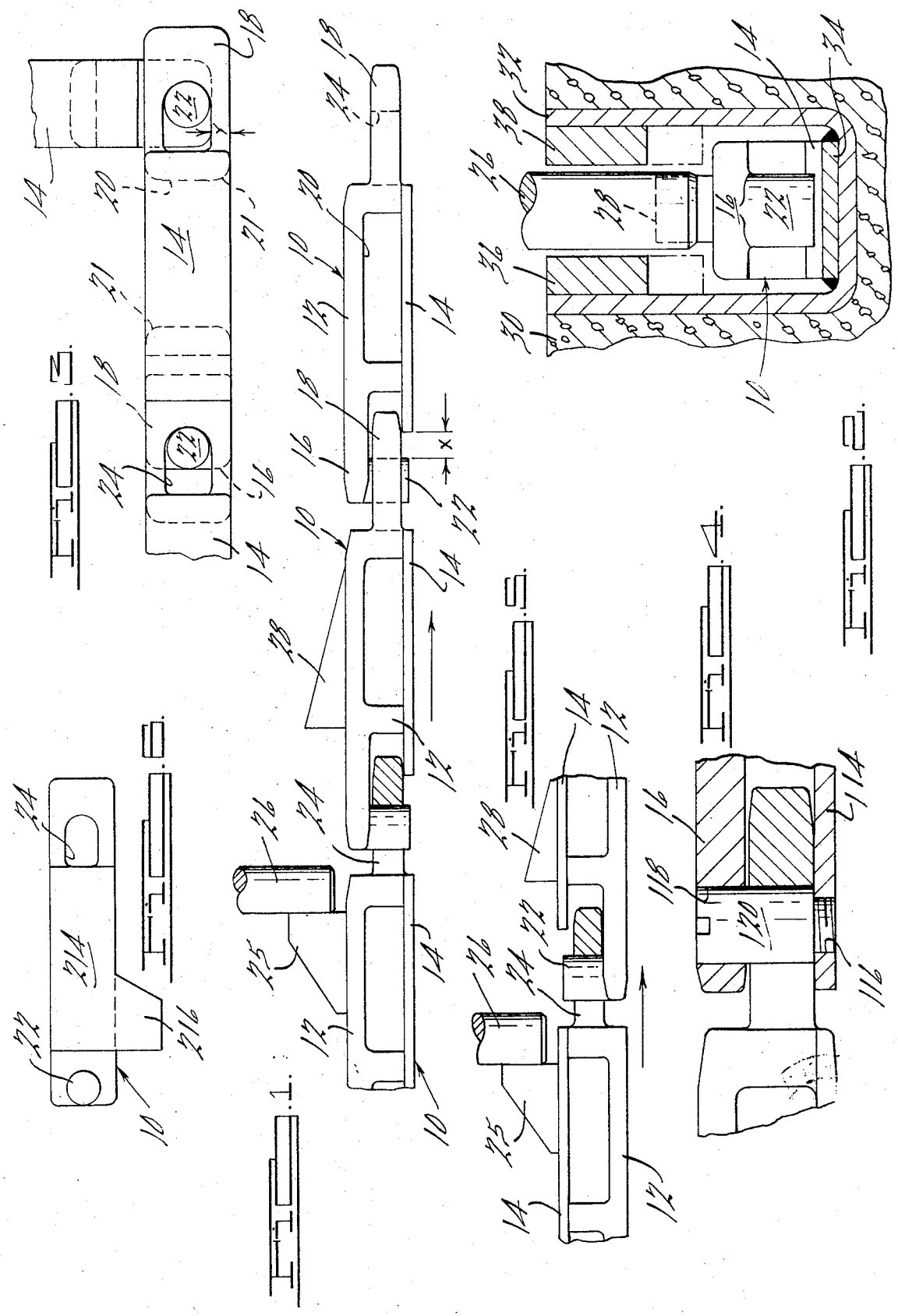

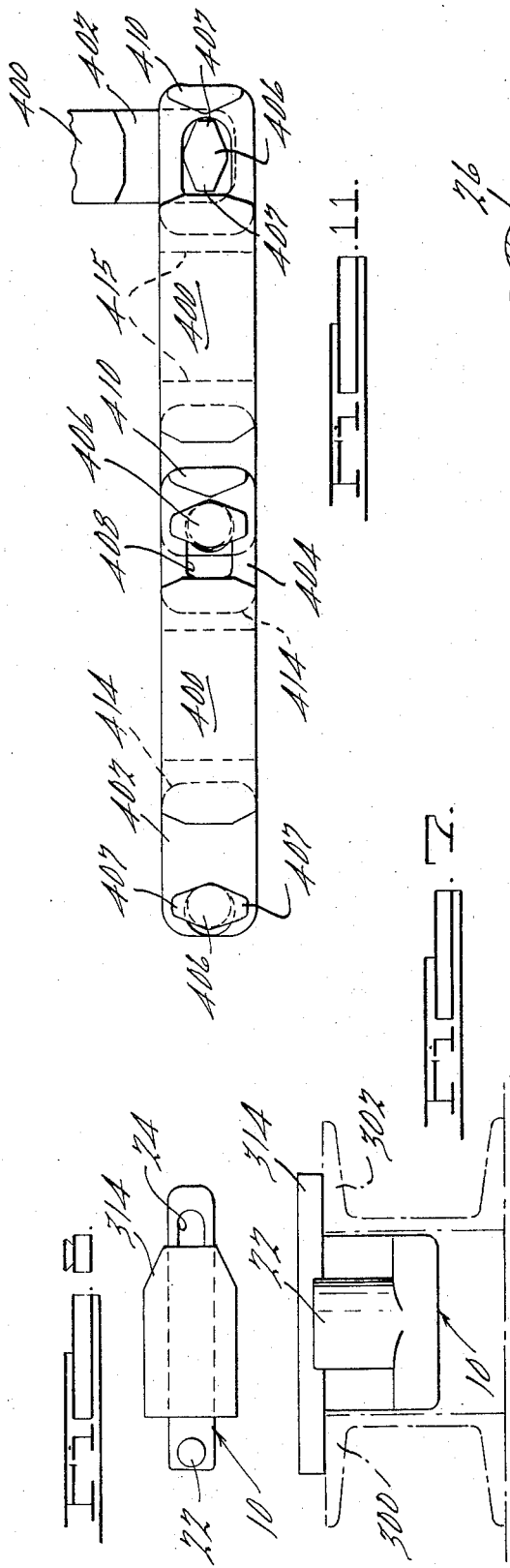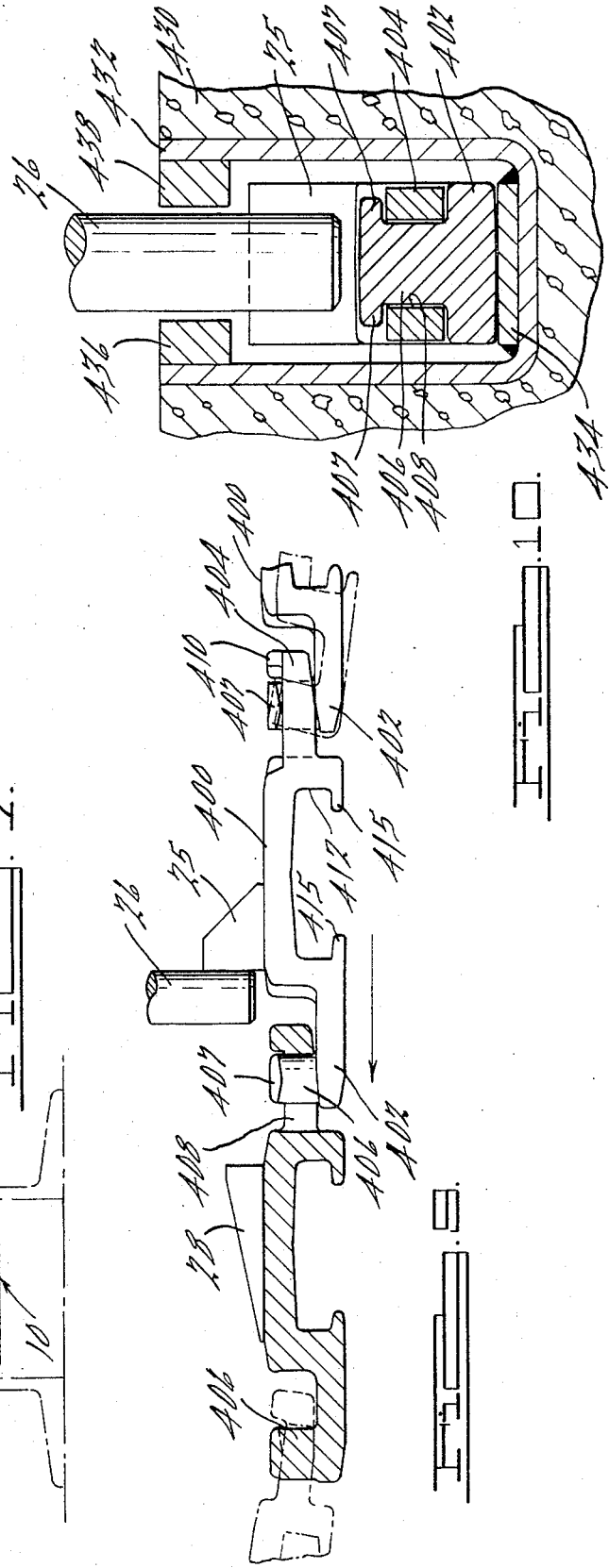

3,856,134

CONVEYOR CHAIN

BACKGROUND AND SUMMARY OF THE INVENTION

Generally speaking, most conveyor chains are composed of at least four elements, i.e., a top outside link and a bottom outside link constituting alternate pitches of the chain, a center link constituting intermediate pitches of the chain, and a connecting pin pivotally interconnecting adjacent links. Usually there is also a separate element comprising a pusher link for engaging the tow pin or the like to be driven. Such chains suffer the disadvantages that there are many different parts to fabricate, inventory and assemble, that they cannot be driven on every link or pitch, that drive dogs or special driving links can only be located on certain pitches of the chain, that there is little flexibility in locating hold back dogs with respect to corresponding drive dogs, and the like.

It is therefore a primary object of the present invention to provide an improved conveyor chain which is relatively simple and inexpensive to fabricate and assemble, and which avoids the aforesaid disadvantages of conventional multi-element chains.

Another important object of the present invention resides in the provision of an improved conveyor chain in which all links are identical to one another, thus simplifying manufacturing, inventorying and installation. A related object concerns the provision of such a conveyor chain in which each link is a single unitary element.

A further object concerns the provision of an improved conveyor chain in which every link or pitch thereof can be driven by a conventional caterpillar or sprocket drive or can drive a conventional power take-off each pitch, whereby surging, pulsations and cordal action are considerably reduced, and smoother operation achieved, in a more compact space.

Another object concerns the provision of a conveyor chain having improved flexibility of use in that each and every link is suited to have attached thereto any desired driving, driven and/or hold back accessory device.

Other objects of the present invention reside in the provision of a conveyor chain which can articulate in a horizontal plane around conventional sprockets, roller turns or traction wheels, which can articulate in a vertical plane to the normal degree, which is relatively smooth on the top, bottom and sides, which can be used right side up, upside down or on its side, which can be run in both directions, which is articulated with sufficient lost motion that take-up due to wear is facilitated, which has a relatively low profile so that the tow pin need not drag on the chain in a normal depth track, and which can be assembled and disassembled in service without tools.

A further object concerns the provision of a conveyor chain which does not require a special tow link, the chain being suited for the addition of a drive dog or pusher dog to any link of the chain.

Another object concerns the provision of a subfloor tow line conveyor chain having a top configuration which is sufficiently continuous and planar to reduce or eliminate the possibility of a tow pin or the like dropping between the links or portions of links to cause a jamming of the conveyor.

A further object of the present invention concerns the provision of an improved link for a conveyor chain which is fabricated from two parts into a unitary link structure, wherein one of such parts is extremely simple and may be of any one of a number of configurations to render the chain suitable for use as a subfloor tow line conveyor chain, a chain-on-edge conveyor chain with rider plates, chain having side finger pushers, and the like, respectively. A related object concerns the provision of such a link in which one of such parts may act as a wear plate, as well as one in which both parts can be easily modified to receive a master pin if such is desired.

These and other objects, features and advantages of the present invention will become apparent from the subsequent description and the appended claims, taken in conjunction with the accompanying drawings.

BRIEF DESCRIPTION OF THE DRAWINGS.

FIG. 1 is a side elevation view of several links of a conveyor chain embodying the principals of the present invention, certain parts being partially in section;

FIG. 2 is a transverse sectional view illustrating the conveyor chain of FIG. 1 (looking to the right) in a typical subfloor installation;

FIG. 3 is a bottom plan view of the conveyor chain of FIG. 1 illustrated in a position for assembly or disassembly;

FIG. 4 is an enlarged fragmentary view partially in section illustrating in side elevation a master pin construction which may be utilized with the conveyor chain of FIG. 1;

FIG. 5 is a side elevation view illustrating the conveyor chain of FIG. 1 utilized in an alternative inverted position as a subfloor conveyor chain, certain parts being partially in section;

FIG. 6 is a top plan view of a modified form of the conveyor chain links shown in FIG. 1, incorporating a side finger pusher;

FIG. 7 is a transverse sectional view of a modified version of the conveyor chain of FIG. 1 adapted for use as a chain-on-edge floor conveyor with rider plates;

FIG. 8 is a top plan view of the link utilized in the modification of FIG. 7;

FIG. 9 is a side elevation view of several links of a second primary embodiment of a conveyor chain embodying the principals of the subject invention, certain parts being partially in section;

FIG. 10 is a transverse sectional view illustrating the conveyor chain of FIG. 9 (looking to the right) in a typical subfloor installation; and FIG. 11 is a top plan view of the conveyor chain of FIG. 9 illustrated in a position for assembly or disassembly.

Generally speaking, each of the primary embodiments of the present conveyor chain disclosed herein comprises all links of identical construction. The primary embodiment illustrated in FIGS. 9–11 is the simplest in design that each link is a single piece of material, i.e., a single casting or forging; whereas the primary embodiment of FIGS. 1–8 comprises links which are fabricated from two elements rigidly affixed together. The advantage of the embodiment of FIG. 1–8 is that it is easier to manufacture than the embodiment of FIGS. 9–11, which requires relatively complex forming dies or molds.

In FIG. 1 there is illustrated a plurality of links 10 articulated together to form a conveyor chain. Each link 10 comprises a body member 12, which may be a forging or high strength casting, and a plate member 14 rigidly affixed thereto, such as by welding, to form an integral structure. Plate member 14 may be an inexpensive stamping. Each body member 12 comprises a rearwardly projecting portion 16 at the top thereof and a forwardly projecting portion 18 at the bottom thereof. The extreme ends of portions 16 and 18 may be slightly beveled in the manner illustrated in FIG. 1. Disposed between portions 16 and 18 is a transversely extending cavity or opening 20 the end walls of which are adapted to be engaged by a conventional caterpillar or sprocket drive (not shown) for driving the conveyor chain in the usual manner. The vertical side edges of opening 20, which is the equivalent of two oppositely disposed side recesses or cavities, may be chamferred as shown at 21 in FIG. 3 to facilitate operation of the drive. The side edges of plate member 14 in cooperation with the top of opening 20 will serve to hold the drive and chain in proper vertical alignment with one another. Adjacent the trailing end of portion 16 is a centrally located downwardly projecting pin 22, and adjacent the trailing end of portion 18 is a centrally located vertically extending opening 24. Pin 22 and opening 24 are of the cross-sectional configurations illustrated in FIG. 3, with opening 24 being spaced from each side of the link a distance designated $y$.

Plate member 14 is of substantially the same width as body member 12 and extends from the trailing end of portion 18 to a point disposed between pin 22 and the main body portion of the link, the distance between the free end thereof and pin 22 being designated $x$. Each link is so constructed that dimension $x$ is slightly greater than dimension $y$, and opening 24 in each portion 18 is spaced from the free end thereof a distance greater than dimension $x$.

The links are articulated together in the manner illustrated with each pin 22 being disposed within the opening 24 in the immediately adjacent link, whereby conveyor driving forces are transmitted between the links by the engagement of each pin 22 with the leading surface of its openings 24. As can be seen, openings 24 have a longitudinal dimension greater than the diameter of pins 22, thereby permitting take-up contraction of the conveyor chain in the normal manner to accommodate for wear. During normal operation of the conveyor chain disengagement of the links is prevented by virtue of the fact that the free end of each portion 18 extends beyond opening 24 a distance greater than dimension $x$, whereby there is an interferring relationship between such end and the trailing edge of plate member 14, as best seen in FIG. 1.

The chain may be easily assembled and disassembled by rotating a link approximately 90°, to the position shown in FIG. 3, in which position there is no interferring relationship between the parts because dimension $y$ is less than dimension $x$. Since no conveyor chain would be subjected in normal usage to a turning angle anywhere near 90° there is no possibility of the individual links becoming disengaged in normal usage. Normally encountered limited relative pivotal movement between the links in a vertical plane may be accommodated by the beveled ends of projections 16 and 18 and the large clearances between pins 22 and openings 24 in the longitudinal direction. Although the chain is illustrated as moving to the right in FIG. 1, it is to be understood that it may similarly be used for operation in the opposite direction with no attendant loss in performance.

In subfloor tow line installations, such as that shown herein for exemplary purposes, a plurality of drive dogs 25 or the like (including spring pusher dogs, spur chain dogs, etc.) may be rigidly affixed, as by welding, to spaced links in the conveyor chain, drive dogs 25 being adapted to engage conventional tow pins 26 affixed to conventional tow carts or the like (not shown). If desired there may also be provided conventional hold back dogs 28 spaced forwardly of drive dogs 25 and also rigidly affixed, as by welding, to one of the links of the conveyor chain, such dogs having an inclined leading surface adapted to engage and lift the tow pin so that it can fall into driving position. Drive dogs and hold back dogs may be affixed to adjacent links of the present conveyor chain or may be disposed further apart, as desired. The flexibility possible with this design, because of the identity of each of the links, is an advantage not present in more conventional chains which have at least two different types of alternating links, only one of which can be provided with a drive dog or hold back dog. With the present chain, attachments may be spaced as close as a single pitch away, as compared to at least two pitches away as in the more conventional chains.

In FIG. 2 there is illustrated in transverse cross section a typical subfloor installation in which there is provided in a floor 30 an upwardly-open longitudinally extending channel 32 following the path of the conveyor and having the conveyor chain slidingly disposed in the bottom thereof. If desired, a wear plate 34 may be affixed to the bottom of the channel in the conventional manner. One advantage of this embodiment of the present invention is that plate member 14 may be formed of a metal, such as brass or other alloys, which is softer than the material (normally steel) of channel 32 so that they may act as wear members, thus obviating the need for a wear plate 34. In such a case plate members 14 are preferably of a thickness which will cause them to wear out at the same time as the pivotal connections between the links. Alternatively, plate members 14 may be formed of a non-sparking material, for explosive atmospheres, or an extra tough material for abrasive environments, such as mining. The flexibility of design is virtually unlimited. Instead of welding, each plate member 14 may be affixed to its body member 12 by brazing or by providing the body member with integral projections which extend through the plate member and are swaged at the end to permanently secure the members together. Conventional threaded fasteners may also be used.

Conventional hold down bars 36 and 38 may be affixed to the inside walls of channel 32 adjacent the top thereof to prevent the conveyor chain from coming out of the channel. In those zones of the conveyor where it is important to maintain the conveyor chain in a vertically fixed position, hold down bars 36 and 38 should extend downwardly to the locations shown in phantom in FIG. 2. As shown, dogs 25 and 28 are relatively narrow in width, i.e., no greater than the diameter of tow pin 26; however, if desired they may extend the full width of the conveyor chain. Such as arrangement would facilitate switching. When full width dogs are used it is not possible to extend hold down bars 36 and 38 downwardly any more than shown in solid lines in FIG. 2 or they will interfere with the dogs.

Although it is not necessary, in any installation, if desired certain spaced links of the conveyor can be provided with a master pin, such as shown in FIG. 4. With respect to those links for which a master pin is desired the plate members are extended rearwardly as shown at 114 and provided with a vertically extending centrally located threaded aperture 116. Projection 16 is in turn provided with an aligned centrally located aperture 118 in which is disposed a master pin 120 having a threaded projection at the lower end thereof disposed within threaded aperture 116. The upper end of master pin 120 may be provided with a screw-driver slot to facilitate insertion and removal. Master pin 120 is preferably of the same diameter as pins 22 and is located at the same pitch distance. In the modification shown in FIG. 4, body member 16 may be identical to that of the embodiment of FIG. 1, the only difference being the addition of aperture 118, thus simplifying fabrication.

If desired, the conveyor chain of FIG. 1 may be utilized in an inverted position, such as illustrated in FIG. 5. In such an arrangement the chain links are in all respects the same as in the FIG. 1 embodiment, the only difference being that the drive and hold back dogs are affixed to plate member 14 instead of to body member 12. Also, in the embodiment of FIG. 5, plate member 14 would not serve as a wear member suited to replace wear plate 34.

In FIG. 6 there is illustrated another modification of the invention incorporating a side finger pusher, such as commonly used in certain subfloor conveyors. The only difference between the link shown in FIG. 6 and that utilized in the first embodiment is that the plate member, indicated at 214, is provided with an integral transverse projection 216 adapted to drivingly engage a conventional tow pin. In such an installation all of the links would be constructed in the manner illustrated in the first primary embodiment except that in those positions in which a driving element is desired, plate member 214 would be substituted in place of a plate member 14 and no drive or hold back dogs such as shown would be utilized.

In FIGS. 7 and 8 there is illustrated a further modification of the conveyor chain of FIG. 1, particularly adapted for chain-on-edge floor conveyors. In such installations there is located on the floor a pair of oppositely disposed channel members or the like 300 and 302 between which the conveyor chain is adapted to be slidingly guided. In this embodiment each link of the chain is the same as that of the first embodiment except that the plate member, indicated at 314, is of a greater width than the body of the link, thus defining laterally extending projections adapted to slide upon and be supported by the upper surfaces of channels 300 and 302. In this embodiment, therefore, the chain is supported by plate members 314, which serve as rider plates. The shape of plate member 314 in plan is illustrated in FIG. 8, which is a top view of a single link. The conveyor chain operates in any application in the same manner as that described with reference to the conveyor of FIG. 1, and any conventional drive and/or hold back means may be affixed to the upper surfaces of plate members 314.

The second primary embodiment of the present invention concerns the use of a truly single-piece link, i.e., a single forging or high strength casting, all links being identical. As illustrated in FIGS. 9–11, each link comprises a body portion 400 having a forwardly projecting portion 402 at the bottom thereof and a rearwardly projecting portion 404 adjacent the top thereof. The leading end of portion 402 is provided with a centrally located upwardly projecting pin member 406 having a pair of transversely extending lugs 407 at the top thereof. Each lug is spaced from the ends of portion 402 a distance slightly greater than the thickness of portion 404 and may be provided with lower beveled surfaces. The ends of portions 402 and 404 may also be generally beveled. Portion 404 is provided with a centrally located generally vertically extending opening 408 having a width slightly greater than that of pin member 406. The trailing end of portion 404 is also provided with an upstanding abutment 410 which is of a height approximately the same as the level of the upper surface of lugs 407, thus providing a relatively continuous upper surface.

As can be seen, lugs 407 extend transversely a distance greater than the width of opening 408 but less than the longitudinal length of opening 408. The individual links of this embodiment are assembled in substantially the same manner as those of the first embodiment. With reference to FIG. 11, it can be seen that when a link is rotated approximately 90° with respect to its adjacent link pin member 406 may be inserted through opening 408 of the adjacent link because the lugs at the top of the pin member are of a transverse dimension less than the longitudinal length of opening 408. When the assembled link is rotated back to a normal operating angle with respect to the link to which it is ajoined, lugs 407, having a greater transverse dimension than the width of opening 408 operate to prevent disengagement of the links.

Tilting of the individual links upwardly and downwardly with respect to one another within normally encountered limits is facilitated by the chamfers or bevels of the respective parts as illustrated in phantom in FIG. 9. As in the first primary embodiment, the present chain may be driven in the conventional manner by a caterpillar or sprocket drive (not shown) and for this purpose each link is provided with a transversely extending through opening or recess 412 having generally vertically chamferred edges 414 engagable by the driving elements disposed at the bottom of opening 412 are opposed flanges 415 which cooperate with the top of opening 412 to maintain the drive and chain in proper vertical alignment. As in the first embodiment, hold back dogs 28 may be rigidly affixed, as by welding, to adjacent or spaced pairs of links, at whatever position on the conveyor chain desired. The articulation of the links and the manner in which take-up is accomplished is the same as in the first embodiment.

In FIG. 10 there is illustrated in transverse cross section a typical subfloor installation of this second primary embodiment, the chain link being sectioned through the center of pin member 46. As can be seen, there is provided in a floor 430 an upwardly-open longitudinally extending channel 432 following the path of the conveyor and having the conveyor chain slidingly disposed in the bottom thereof. If desired, a wear plate 434 may be affixed to the bottom of the channel in the conventional manner. Conventional hold down bars 436 and 438 may be affixed to the inside walls of channel 432 adjacent the top thereof to prevent the conveyor chain from coming out of the channel in those zones of the conveyor where it is important to maintain the conveyor chain in a fixed vertical position. As shown, dogs 25 and 28 are relatively wide, having a width substantially the same as the chain link; however, if desired they may be narrower, as shown in FIG. 2, the same criteria governing.

In all of the embodiments the various exposed parts of each link are designed to provide a relatively smooth and uninterrupted or continuous surface in which the gaps which do exist, as well as the gaps between adjacent links, are less than the diameter of the tow pin. This reduces or eliminates the possibility of a tow pin or the like dropping into a gap and causing a jam. Also, both primary embodiments of the present chain may be run in either longitudinal direction, and with the pin or pin member projecting either upwardly, downwardly or to the side. When used on its side, a vertical caterpillar or sprocket drive would be used.

Thus, there is disclosed in the above description and in the drawings several embodiments of the invention which fully and effectively accomplish the objects thereof. However, it will be apparent that other variations in the details of construction may be indulged in without departing from the sphere of the invention herein described, or the scope of the appended claims.

What is claimed is:

1. A conveyor chain comprising a plurality of identical links articulated together, each of said links comprising a longitudinally extending body portion having adjacent one end first means defining an opening and adjacent the opposite end second means defining a first projection, the axis of said first projection being disposed generally parallel to the axis of said opening, said first projection on each link being pivotally receivable within said opening in the immediately adjacent link, and locking means for preventing removal of each said first projection from the opening in which it is disposed except when the longitudinal axes of the respective immediately adjacent links are positioned at approximately right angles with respect to one another in a plane perpendicular to the axis of said opening, said locking means comprising means on each said link defining a second projection adjacent said first projection, said second projection being spaced from said first projection a distance less than the distance between said opening and the free end of said first means so that said second projection will engage said first means on said immediately adjacent link and prevent such removal except when said immediately adjacent links are in said position.

2. A conveyor chain comprising a plurality of identical links articulated together, each of said links comprising a longitudinally extending body portion having adjacent one end first means defining an opening and adjacent the opposite end second means defining a first projection, the axis of said first projection being disposed generally parallel to the axis of said opening, said first projection on each link being pivotally receivable within said opening in the immediately adjacent link, and locking means for preventing removal of each said first projection from the opening in which it is disposed except when the longitudinal axes of the respective immediately adjacent links are positioned at approximately right angles with respect to one another in a plane perpendicular to the axis of said opening, said locking means comprising means on each said link defining a second projection adjacent said first projection, said second projection being spaced from said first projection a distance greater than the transverse distance between said opening and the side edge of said first means and being arranged to engage said first means on said immediately adjacent link and prevent such removal except when said immediately adjacent links are in said position.

3. A conveyor chain as claimed in claim 2 wherein said second projection is spaced from said first-recited projection a distance less than the distance between said opening and the free end of said first means.

4. A conveyor chain link comprising: a longitudinally extending body having an integral first longitudinal projection extending from one end adjacent one side thereof and an integral second longitudinal projection extending from the opposite end adjacent the opposite side thereof, said first and second projections being disposed on opposite sides of a horizontal longitudinal plane passing through said body; means defining driven means on the sides of said body intermediate said one and said opposite sides adapted to be drivingly engaged by a conventional drive; means defining a pivot pin forming an integral part of one of said projections and having a generally transverse axis; means defining an opening through the other of said projections, and opening having an axis generally parallel to the axis of said pin and a minimum width slightly greater than the maximum width of said pin; and a generally flat plate rigidly affixed to said one side of said body, said pin being disposed on said second projection and extending toward the outside plane of said plate, said plate having a longitudinally extending terminal portion disposed generally parallel to and spaced from said second projection with said portion terminating a predetermined distance from said pin, said distance being greater than the transverse distance between said opening and the side of said first projection.

5. A conveyor chain link comprising: a longitudinally extending body having an integral first longitudinal projection extending from one end adjacent one side thereof and an integral second longitudinal projection extending from the opposite end adjacent the opposite side thereof, said first and second projections being disposed on opposite sides of horizontal longitudinal plane passing through said body; means defining driven means on the sides of said body intermediate said one and said opposite sides adapted to be drivingly engaged by a conventional drive; means defining a pivot pin forming an integral part of one of said projections and having a generally transverse axis; means defining an opening through the other of said projections, said opening having an axis generally parallel to the axis of said pin and a minimum width slightly greater than the maximum width of said pin; and a generally flat plate rigidly affixed to said one side of said body, said pin being disposed on said second projection and extending toward the outside plane of said plate, said plate having a longitudinally extending terminal portion disposed generally parallel to and spaced from said second projection with said portion terminating a predetermined distance from said pin, said distance being less than the distance between said opening and the free end of said first projection.

6. A conveyor chain link comprising: a longitudinally extending body having an integral first longitudinal projection extending from one end adjacent one side thereof and an integral second longitudinal projection extending from the opposite end adjacent the opposite side thereof, said first and second projections being disposed on opposite sides of a horizontal longitudinal plane passing through said body; means defining driven means on the sides of said body intermediate said one and said opposite sides adapted to be drivingly engaged by a conventional drive; means defining a pivot pin forming an integral part of one of said projections and having a generally transverse axis; means defining a longitudinally elongated opening through the other of said projections, said opening having an axis generally parallel to the axis of said pin and a minimum width slightly greater than the maximum width of said pin; and a generally flat plate rigidly affixed to said one side of said body, said pin being disposed on said second projection and extending toward the outside plane of said plate, said plate having a longitudinally extending terminal portion disposed generally parallel to and spaced from said second projection with said portion terminating a predetermined distance from said pin, the cavity defined between said plate portion and said second projection has a longitudinal length at least as great as the difference in longitudinal dimensions of said opening and pin.

7. A conveyor chain link comprising: a body having a longitudinal axis; first means projecting longitudinally in one direction from said body; a generally cylindrical pin on said first means, the axis of said pin extending at approximately a right angle with respect to said longitudinal axis; second means projecting longitudinally in said direction from said body and terminating at a point spaced longitudinally inwardly of the position of said pin; and third means projecting longitudinally in the opposite direction from said body and having an opening therethrough, the axis of said opening being generally parallel to the axis of said pin, said opening being of sufficient size to receive a corresponding pin on an identical chain link and being spaced from the free end of said third means a longitudinal distance greater than the longitudinal space between said pin and the free end of said second means.

8. A conveyor chain link comprising: a body having a longitudinal axis; first means projecting longitudinally in one direction from said body; a generally cylindrical pin on said first means, the axis of said pin extending at approximately a right angle with respect to said longitudinal axis; second means projecting longitudinally in said direction from said body and terminating at a point spaced longitudinally inwardly of the position of said pin; and third means projecting longitudinally in the opposite direction from said body and having an opening therethrough, the axis of said opening being generally parallel to the axis of said pin, said opening being of sufficient size to receive a corresponding pin on an identical chain link and being spaced from the side edge of said third means a transverse distance less than the longitudinal space between said pin and the free end of said second means.

9. A conveyor chain link comprising: a body having a longitudinal axis; first means projecting longitudinally in one direction from said body; a generally cylindrical pin extending away from said first means, the axis of said pin extending at approximately a right angle with respect to said longitudinal axis with the free end of said pin being spaced from said first means; second means projecting longitudinally in the opposite direction from said body and having an opening therethrough, said opening being defined by a continuous and uninterrupted surface extending for 360° therearound with the axis thereof being generally parallel to the axis of said pin, said opening being of sufficient size to receive a corresponding pin on an identical chain link to pivotally join two such links together; and locking means on said link including a projection adapted to engage said second means on an identical chain link joined thereto except when the longitudinal axes of the respective immediately adjacent joined links are at approximately right angles with respect to one another, said projection extending longitudinally in said direction from said body and being spaced longitudinally inwardly from said pin.

* * * * *